J. J. REINHOLD.
METHOD OF INSULATING WIRE.
APPLICATION FILED JAN. 9, 1917.

1,329,630.

Patented Feb. 3, 1920.

INVENTOR
John J. Reinhold.

BY

ATTORNEY

UNITED STATES PATENT OFFICE.

JOHN J. REINHOLD, OF MARIETTA, PENNSYLVANIA.

METHOD OF INSULATING WIRE.

1,329,630.         Specification of Letters Patent.       Patented Feb. 3, 1920.

Application filed January 9, 1917. Serial No. 141,438.

*To all whom it may concern:*

Be it known that I, JOHN J. REINHOLD, a citizen of the United States, residing at Marietta, in the county of Lancaster and State of Pennsylvania, have invented certain new and useful Improvements in Methods of Insulating Wire, of which the following is a specification, reference being had therein to the accompanying drawing.

This invention relates to insulating or covering wire with asbestos or other similar material.

Various means have heretofore been employed, such as coating the wire with an adhesive, then applying flocculent asbestos and rolling the same upon the wire and coating with a binder. Also the asbestos has first been placed upon a tape as a carrying means, and upon threads or strings, the latter of which has been for the purpose of holding the asbestos in place until it could be rolled or pressed upon the wire and then coated.

In all of these methods, with the exception of where the asbestos is first placed upon threads or strings, the use of the adhesive and outer coating will at times adhere to the rolling or pressing devices and the wire is liable to be skinned.

The principal advantage in this method is to prevent the wire from becoming "skinned" during the process of insulating the same with asbestos or other similar material.

Another object is to produce a wire having a coating of uniform thickness.

Still another object being to produce a coating that can be repeatedly bent without cracking the insulating covering.

By this method "short fiber asbestos" can be used to an advantage instead of having to use the more expensive "long fiber asbestos".

Another advantage is that the wire can be insulated, with asbestos or other similar material, at a much greater speed than where a "binder" (in the shape of a cord or twine) is not used to prevent skinning taking place thereby effecting a great saving in the cost of manufacture.

Another advantage is that this method will perform the operation with one machine and one operator, thereby causing a saving over the most improved process known to me, and which requires two distinct machines and two operators to perform the operation; one machine and one operator to apply the asbestos to the cord or twine, and one machine and operator to apply the asbestos covered twine to the wire.

Another advantage in this method is that the flocculent asbestos is applied to the wire in a conglomerate form, whereas in other methods, the asbestos covered cord or twine is applied to the wire in layers, and when the insulated wire is bent, these layers are liable to become separated and expose the wire; and in case the asbestos covered twine should have a torn or ragged edge, then the layers of asbestos will not join together properly, in which case the wire will be left exposed, if not detected and remedied during the process of insulation.

In practice, it is found that asbestos covered twine is liable to become twisted, in which case it would cause delays in operation, as it would then be necessary to remove the defective insulation and to re-insulate that part where it was found to be defective.

With these and other objects in view, my invention consists in certain construction and combination of parts as will hereinafter be fully described and claimed in the specification, and illustrated in the accompanying drawings, which form a part of this application, and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings:—

Referring to the drawings:—

Figure 1:
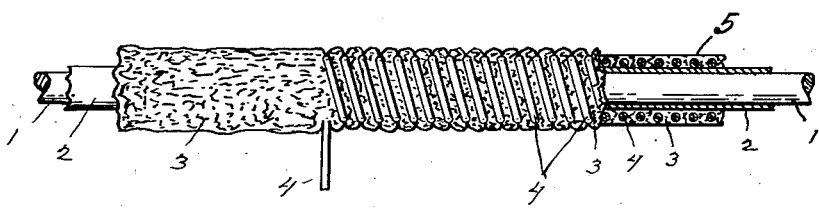
Figure 1, shows a longitudinal sectional view of wire with the successive layers of material, and in the different stages of manufacture.

The wire is represented by the numeral 1, and it is intended that the wire or conductor may be operated by any of the well known machines for coating the same with asbestos or other similar material.

The wire 1, being conveyed through the machine is first coated with a layer of adhesive 2, upon which is applied a layer of flocculent asbestos 3, and upon this coating of asbestos 3, is wound or braided a cord or tape 4, of silk, cotton or other suitable material, and as it is wound upon the asbestos coating 3, in an open spiral, it will be pressed or embedded in the insulating material.

The cord can be first coated with a binder before applying the asbestos, and after the cord has been applied, a series of pressing rolls are applied, which reduce it to the form shown by numeral 5, in Fig. 1, producing a covering of uniform thickness.

Figure 2:
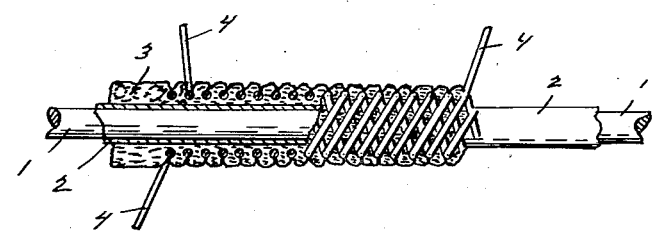
Fig. 2, shows a modified form.
Figure 3:
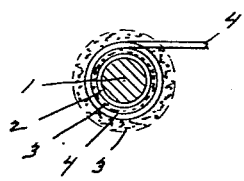
Fig. 3, shows an end view of form shown in Fig. 1.
Figure 4:
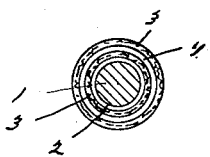
Fig. 4, shows another end view of the finished product in the form shown in Fig. 1.
Figure 4:

In Fig. 2, the layers of cord are employed in a crossed position.

In order to produce a "wire" having a fire-proof insulation—it is customary to apply "asbestos" upon the same in a flocculent form, and rolling and pressing it upon the wire in order to produce a thin and compact insulation.

In practice it has been found in applying flocculent asbestos upon a wire and rolling and pressing it upon the same without employing some means to hold the asbestos in place during this operation—that the wire will become skinned and thereby making it necessary to close down the insulating machine very frequently in order to patch the "skinned" part or parts and then this patching of the wire produces an uneven insulation which is not desirable for commercial purposes.

The operator of the insulating machine has to keep close watch for skinned parts and if the same should be overlooked then a satisfactory commercial product would not be produced.

Such a method of insulating wire as described is a very slow and expensive one as the rolling and pressing of the asbestos upon the wire has to be done very slowly to prevent skinning of the wire as much as possible.

By employing the use of a cord, or series of cords, wound in an open spiral around and on top of the flocculent asbestos covered wire, to hold same firmly in place while it is being rolled and pressed upon the wire—this "skinning" of the wire will be prevented and it will enable to produce an extremely thin and uniform insulation which is found to be a very important factor for commercial purposes, and a cord to hold the asbestos in place upon the wire—the insulating operation will be greatly increased and thereby the output of the machine will be increased and the cost reduced.

Having thus described my invention, what I claim as new and desire to secure by Letters Patent is:—

A method of insulating conductors, consisting of coating the same with a layer of binding material, and a layer of asbestos, and winding a cord thereon in an open spiral for the purpose of holding the asbestos while being rolled and pressed.

In testimony whereof I affix my signature in presence of two witnesses.

JOHN J. REINHOLD.

Witnesses:
JOHN J. THOMPSON,
A. F. SHENCK.